(No Model.)

C. W. SIEMENS.
GAS PRODUCER.

No. 288,877.        Patented Nov. 20, 1883.

(No Model.)  C. W. SIEMENS.  5 Sheets—Sheet 2.
GAS PRODUCER.

No. 288,877.  Patented Nov. 20, 1883.

(No Model.)

C. W. SIEMENS.
GAS PRODUCER.

No. 288,877.

5 Sheets—Sheet 3.

Patented Nov. 20, 1883.

WITNESSES:

INVENTOR:

(No Model.)

C. W. SIEMENS.
GAS PRODUCER.

No. 288,877.

5 Sheets—Sheet 4.

Patented Nov. 20, 1883.

WITNESSES:

INVENTOR:
C. W. Siemens
by U. S. Whitman Attorney.

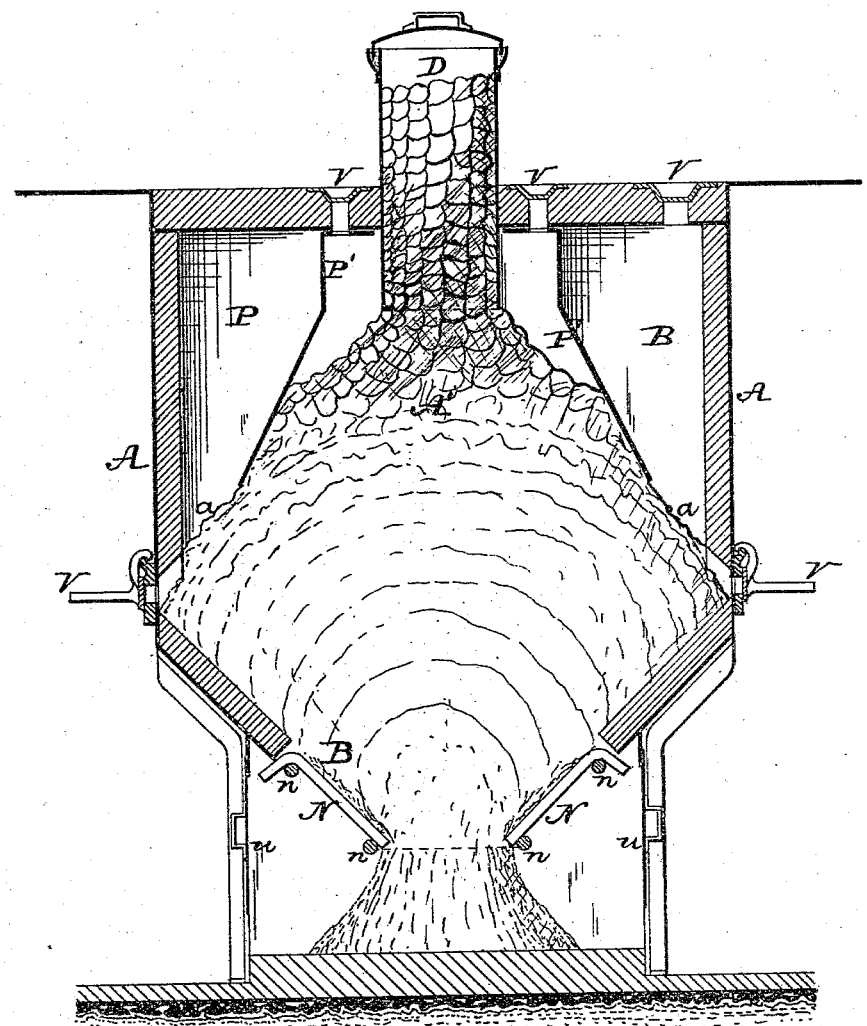

UNITED STATES PATENT OFFICE.

CHARLES W. SIEMENS, OF WESTMINSTER, COUNTY OF MIDDLESEX, ENGLAND.

GAS-PRODUCER.

SPECIFICATION forming part of Letters Patent No. 288,877, dated November 20, 1883.

Application filed January 30, 1883. (No model.) Patented in France January 31, 1881, No. 140,857; in Germany February 2, 1881, No. 16,223; in Belgium February 24, 1881, No. 53,927, and in England August 31, 1881, No. 3,792.

*To all whom it may concern:*

Be it known that I, CHARLES WILLIAM SIEMENS, of Westminster, in the county of Middlesex, England, have invented new and useful Improvements in Gas-Producers, (for which I have obtained a patent in Great Britain, No. 3,792, bearing date August 31, 1881, and for which I made applications for patents in France, Belgium, and Germany, of which the following is a specification.

My invention relates to gas-producers of the kind for which I obtained Letters Patent of the United States No. 282,387 on the 31st day of July, 1883; and it consists in structural modifications thereof, which are particularly described in the following specification, reference being made to the accompanying drawings.

Figure 1:
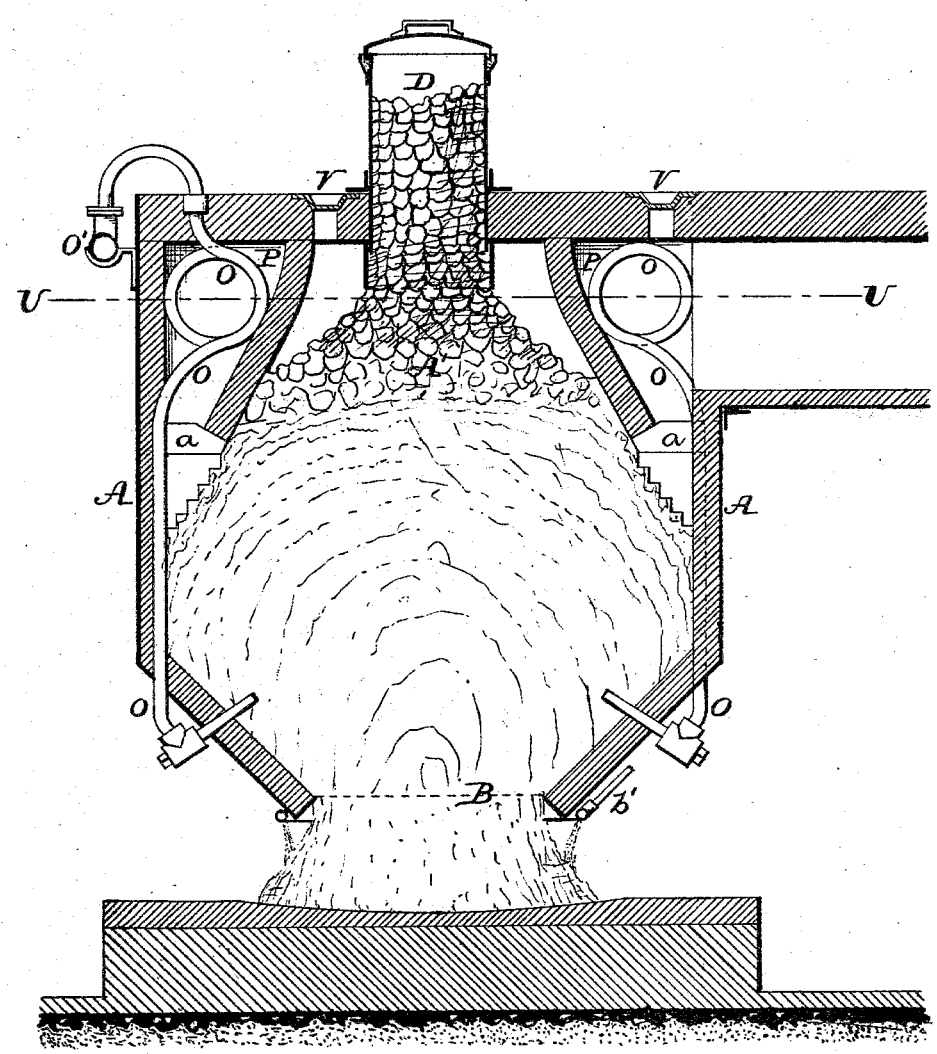
Figure 2:
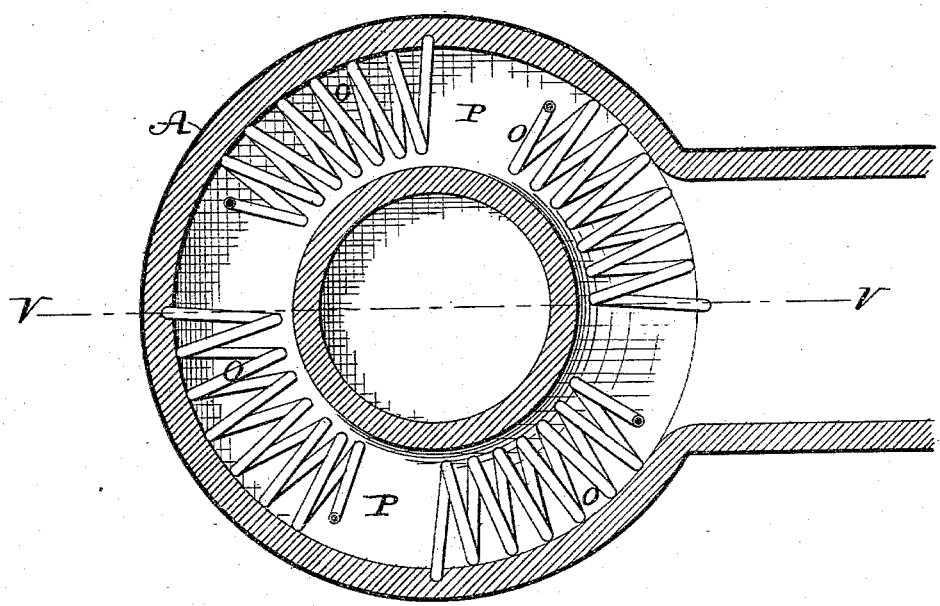

Figure 1 is a vertical section of one form of my improved gas-producer supplied with air under pressure by two or more jets, taken on line V V of Fig. 2. Fig. 2 is a sectional plan of the same gas-producer, taken on line U U of Fig. 1.

This gas-producer consists of a cylindrical iron casing, A, truncated downward and lined with fire-bricks, having an opening, B, at the bottom, through which the cinder is discharged, and such cinder may be cooled by water from the pipes b'. The air-supply pipes O project through the lower sloping part at several points, and direct the air-currents obliquely upward toward the heart of the fuel in the gas-producer.

The upper part of the apparatus consists of a conical chamber, A', with an annular space, P, surrounding it, separated from each other by a fire-brick wall; and in order to heat the air supplied to the gas-producer and to cool the gas produced, the air-pipes O may be bent into coils or zigzags, which are placed in the annular space P, where the gases collect on their way to the furnaces. The air-supply pipes O communicate with a main pipe, as shown at O', charged with air under pressure; or the air-supply may be led to the nozzles outside the gas-producer, so as to supply the air without being previously heated.

Figure 3:
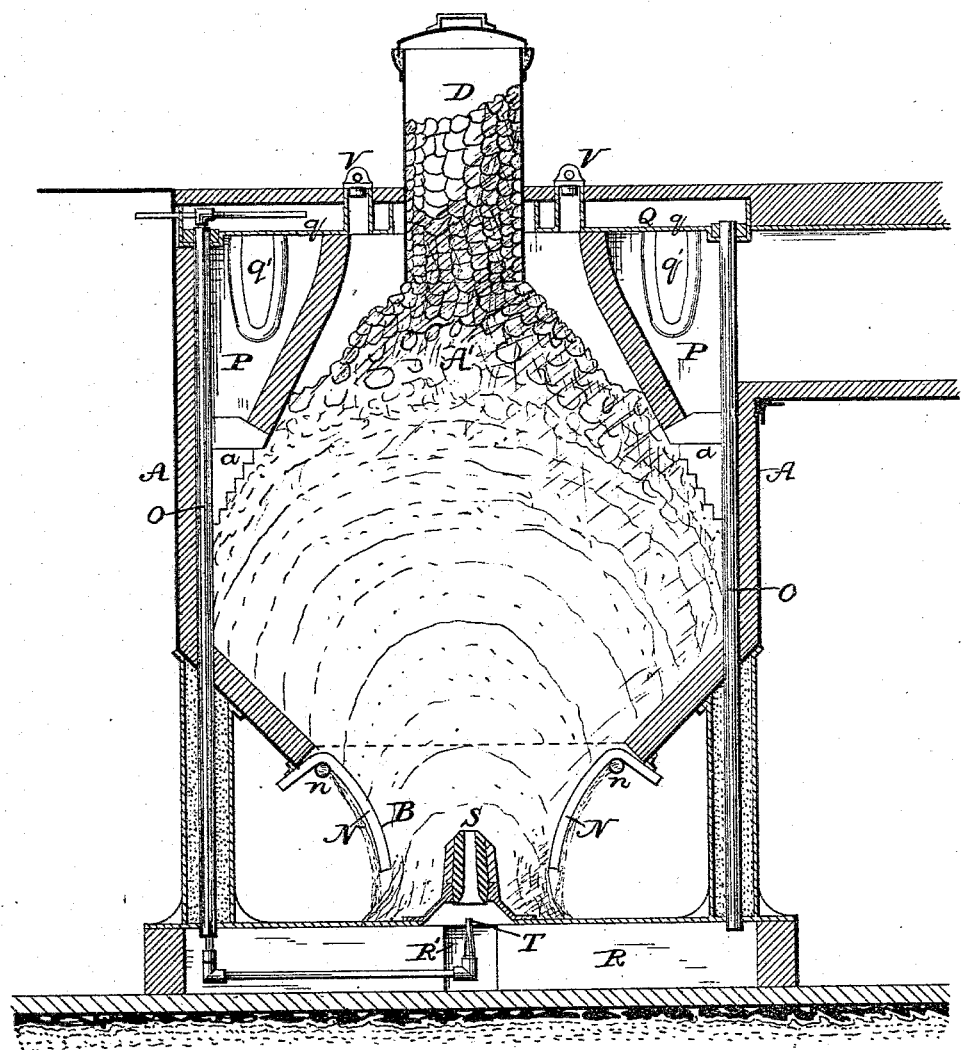

Owing to the number of jets with which a gas-producer of this form can be provided, it may be made considerable in size, so as to be capable of converting into gas a large quantity of fuel per day. When a more moderate production is required, some of the air-supply jets are to be cut off; but in that case I prefer to employ a gas-producer as shown by Fig. 3, which is a vertical section of a second form of gas-producer supplied with air by means of a central jet at the bottom.

Figure 4:
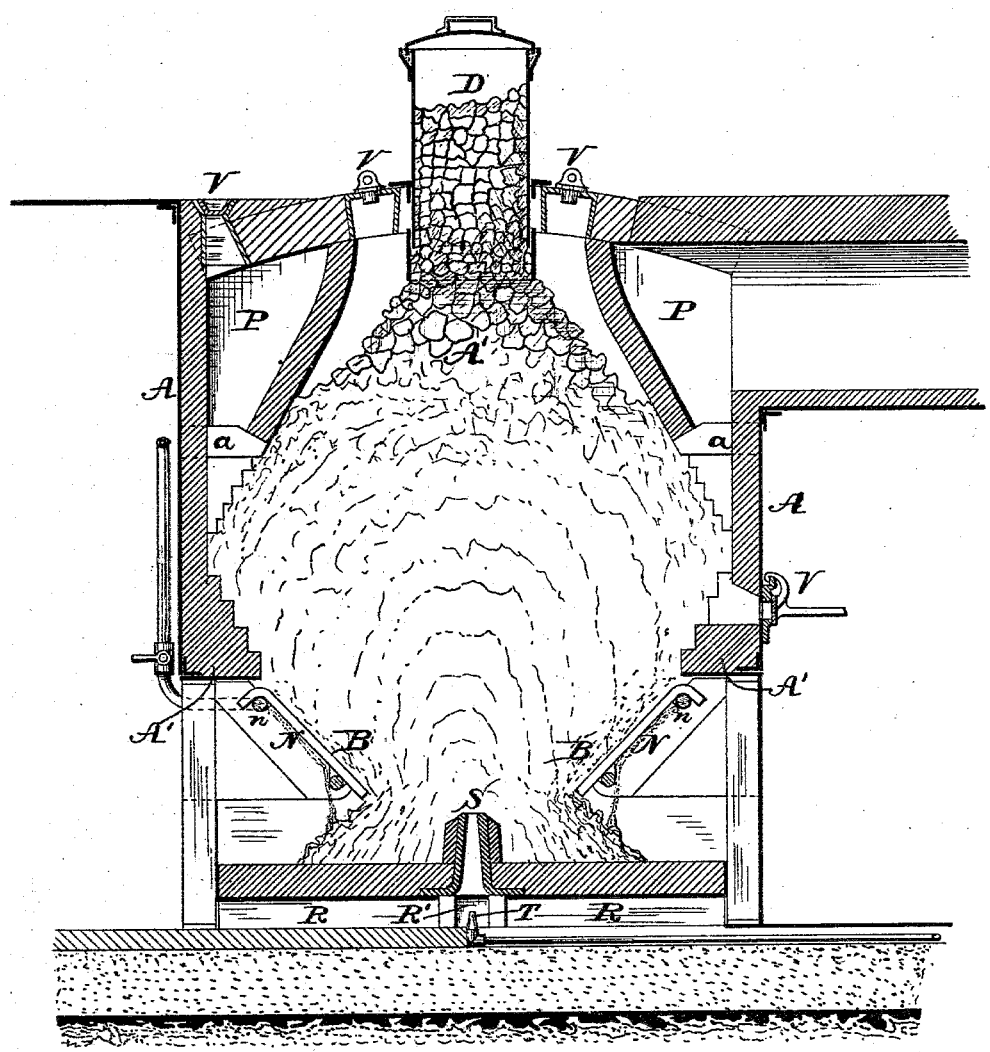

This gas-producer consists of a cylindrical iron casing truncated downward, the lower part of the sloping bottom B being constructed as an open grate, through which air, in addition to that supplied at the nozzle S, is admitted to the apparatus. The grate may be formed of bent bars N, hooked with their bent upper ends onto a circular support, n, as shown. The air supplied at the bottom of the gas-producer is previously heated by passing through a casing, Q, at the top, separated by a metal plate, q, from the space P, in which the gases collect, and in order to increase the heating effect on the incoming air the plate q may be made with pockets q', projecting down into the space P. The air descends from the casing Q by pipes O, leading to channels R, under the floor of the gas-producer, and thence to a central space, R', whence it rises through the nozzle S into the body of the fuel if it be under pressure; or a current may be induced by a steam-jet, T, which also supplies a quantity of aqueous vapor to act with the air upon the fuel. Water can also be supplied to this gas-producer, which may be done conveniently by forming the circular support n to the grate-bars of a perforated pipe, as shown, which water, dropping as streams against the bent bars N and the hot cinders, serves the double purpose of cooling them and of supplying the gas-producer with aqueous vapor. Instead of using the double casing Q, the inflowing air may be heated by means of zigzag pipes or coils, as shown in Figs. 1 and 2; or air at atmospheric temperature may be admitted, in which case the gas-producer may be covered by a fire-brick dome, as shown in Fig. 4, which is a vertical section of a third form of gas-producer supplied with air at atmospheric temperature.

This gas-producer consists of a cylindrical iron casing, A, with a flange, A', at the bottom, lined with fire-bricks, which are gathered in upon the flange A', as shown, so as to form with the grate below a conical support for the fuel. In this case the air is admitted to the jet through openings at the extremities of the channels R, being only heated by its passage through such channels. Should the demand for gas slacken from any cause, the forced air-supply to these gas-producers may be reduced or may be entirely dispensed with from time to time, as they can be worked without a forced air-supply, their production of gas under these conditions being considerably reduced, to be increased again, when required, by having recourse to the forced air-supply. When a forced air-supply is not available, I prefer to use the construction shown by Fig. 5, which is a vertical section of a fourth form of gas-producer, with a grate at foot, and a curtain around it for reducing, when desired, the ingress of air to the apparatus.

This gas-producer consists of a cylindrical iron casing, A, truncated downward, the lower part of the sloping bottom being provided with a grate, B, at foot. The requisite air is admitted between the bent bars N, which may be supported by rings $n\ n$, as shown; or they may with advantage be made as shown in Figs. 3 and 4. The grate is inclosed by a movable screen provided with doors $u$, that can be opened and shut, so as to admit more or less air to the gas-producer.

In this form of gas-producer, instead of a partition of bricks separating the incoming fuel from the gases produced, a metal partition, P', may be employed, as shown. Water may be admitted at the foot of this gas-producer by means of a perforated pipe, as shown in Fig. 3, or otherwise.

Stoking-holes V are shown as provided at top and sides of these gas-producers, through which bars may be introduced for breaking up the fuel and removing clinkers and ashes, and others are added as required.

The above-described several forms of gas-producers are obviously applicable to the production of combustible gas for heating purposes generally and for gas-motors. Instead of being circular in plan, they may be made approximately circular or polygonal or of other forms, and in such cases the use of two or more jets may be found advantageous.

The action of these gas-producers when at work is as follows: The fuel to be converted into gas is introduced through the hopper D, and gradually descends into the conical chamber or retort A', where it parts with its volatile constituents, these gases percolating through the mass of fuel below, to find an exit, with the other gases produced from the thorough decomposition of the fuel, through openings $a$ into the annular space P. On its further descent in the apparatus the fuel will become incandescent, and be entirely converted into gas by the action of air and vapor of water introduced at the jets, grate, or opening at the foot of the gas-producer. The range of maximum temperature will be more or less removed from the bottom or grate-bars, according to the pressure of the forced air-supply, and when the forced air-supply is dispensed with the conical retort A' at the top is made of iron, as shown in Fig. 5, in order to readily transmit the heat of the outflowing gases to the fuel charged in the gas-producer.

I do not claim the process of producing combustible gas by the action of heated air introduced from below into the body of the kindled fuel, or a gas-producer having an air-supply pipe extended upward from the bottom, and a gas-eduction pipe, as these form the subject-matter of another application for Letters Patent of the United States, filed by me on the 5th day of August, 1882.

Having thus described my invention, I claim and desire to secure by Letters Patent in the United States—

1. A gas-producer having an annular retort at its upper part, a forced air-supply pipe at its foot leading into the body of the fuel, and a space in which the gases collect surrounding the annular retort, as and for the purposes described.

2. The combination, in a gas-producer, of a retort in the upper part, a forced air-supply at the foot, an open ash-pit, and a grate in the inclined lower part, as and for the purposes described.

3. The annular space in which the gases collect, the air-induction pipes, pockets, or conduits arranged within such space, the forced air-supply pipe at the foot of the gas-producer, and the open ash-pit, all combined as and for the purposes described.

4. The circular support to the grate-bars, constructed of perforated pipe, in combination with the grate-bars, whereby the water flowing from the former serves the double purpose of cooling the grate-bars and supplying the gas-producer with aqueous vapor.

5. The air-conduction pipes arranged within the annular space in which the gases collect, the channels R under the floor of the gas-producer, the central space, R', and the nozzles S, leading into the body of the fuel.

6. The combination of the steam-jet T, the channel R, the central space, R', the nozzle S, and the air-induction pipes arranged within the space in which the gases collect, as and for the purposes described.

In testimony whereof I affix my signature in presence of two witnesses.

CHARLES WILLIAM SIEMENS.

Witnesses:
CHAS. ROCHE,
2 *Waterloo Place, Pall Mall, London, Notary's Clerk.*
THOS. MARCH,
2 *Waterloo Place, Pall Mall, London, Army Agent's Clerk.*